(12) United States Patent
Tsurui et al.

(10) Patent No.: US 7,266,288 B2
(45) Date of Patent: Sep. 4, 2007

(54) VIDEO/AUDIO PLAYBACK APPARATUS AND VIDEO/AUDIO PLAYBACK METHOD

(75) Inventors: Taisuke Tsurui, Niihama (JP); Takami Uemura, Niihama (JP); Toshihisa Ohiro, Saijo (JP); Yoichi Hida, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 246 days.

(21) Appl. No.: 11/064,509

(22) Filed: Feb. 24, 2005

(65) Prior Publication Data
US 2005/0185923 A1  Aug. 25, 2005

(30) Foreign Application Priority Data
Feb. 25, 2004 (JP) ............................. 2004-050010
Feb. 14, 2005 (JP) ............................. 2005-036909

(51) Int. Cl.
*H04N 5/91* (2006.01)
(52) U.S. Cl. .............................. 386/68; 386/75; 386/95; 386/96
(58) Field of Classification Search ................ 386/6–8, 386/35, 65, 69, 75, 78, 96, 68, 95
See application file for complete search history.

(56) References Cited
U.S. PATENT DOCUMENTS

| | | | |
|---|---|---|---|
| 4,635,138 A * | 1/1987 | Louth ........................... | 386/68 |
| 5,438,372 A * | 8/1995 | Tsumori et al. ............... | 348/565 |
| 5,754,241 A * | 5/1998 | Okada et al. .............. | 375/240.05 |
| 2002/0141738 A1* | 10/2002 | Yagi et al. ..................... | 386/98 |
| 2002/0181937 A1* | 12/2002 | Yamamoto et al. ........... | 386/95 |
| 2004/0221306 A1* | 11/2004 | Noh ............................. | 725/44 |
| 2004/0264577 A1* | 12/2004 | Jung ..................... | 375/240.24 |
| 2005/0030427 A1* | 2/2005 | Yamada ..................... | 348/559 |
| 2005/0100323 A1* | 5/2005 | Miyashita et al. ............. | 386/95 |

FOREIGN PATENT DOCUMENTS

| | | |
|---|---|---|
| JP | 8-298645 | 11/1996 |
| JP | 11-120705 | 4/1999 |
| JP | 2002-359812 | 12/2002 |

* cited by examiner

*Primary Examiner*—Thai Q. Tran
*Assistant Examiner*—Tat Chi Chio
(74) *Attorney, Agent, or Firm*—Wenderoth, Lind & Ponack, L.L.P.

(57) ABSTRACT

Provided is a video/audio playback apparatus and a video/audio playback method in which on receiving an instruction for switching video operation from the video operation switching circuit, a data reading circuit reads a video/audio stream for playing an audio and a video/audio stream for playing a video from a recording medium, and an audio playback circuit reproduces an audio stream separated from the video/audio stream for playing the audio on the basis of time management information embedded in the audio stream and a predetermined reference time, and a video playback circuit reproduces a video stream separated from the video/audio stream for playing the video on the basis of a reference time different from the reference time, and thereby the video can freely played with the audio being normally played.

17 Claims, 13 Drawing Sheets

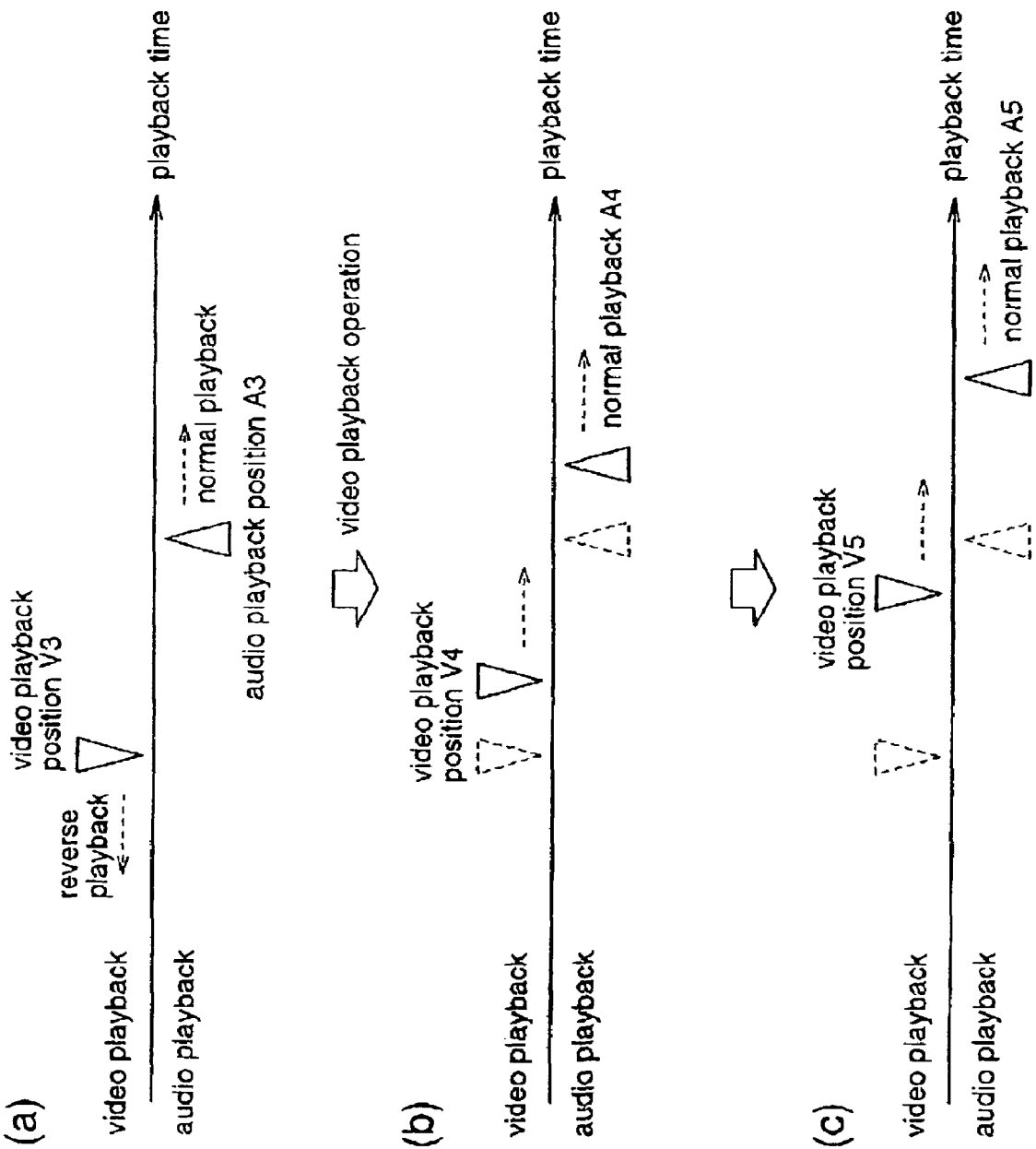

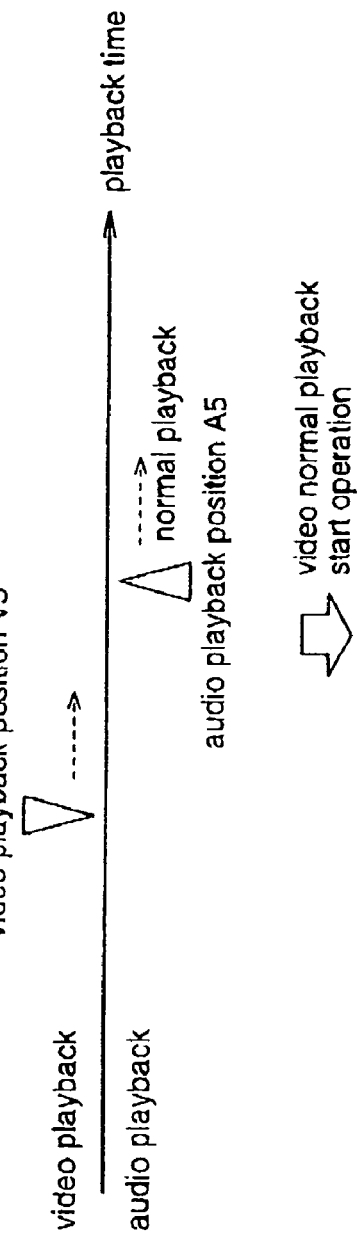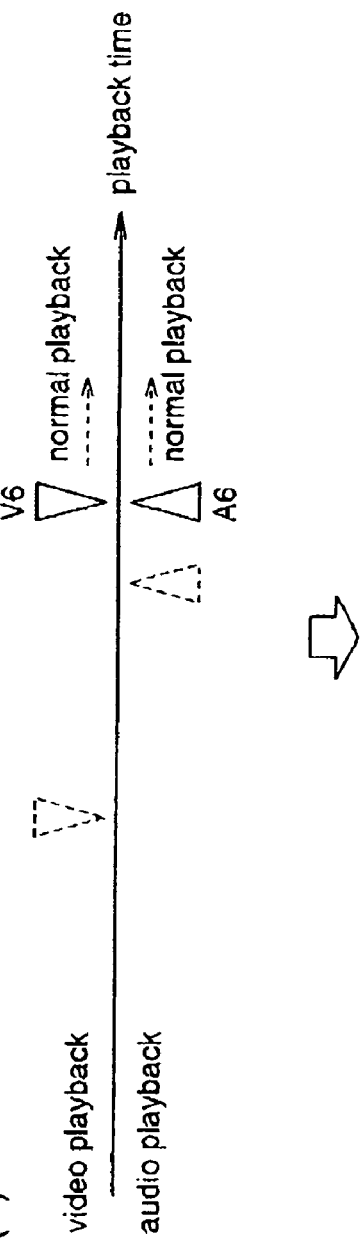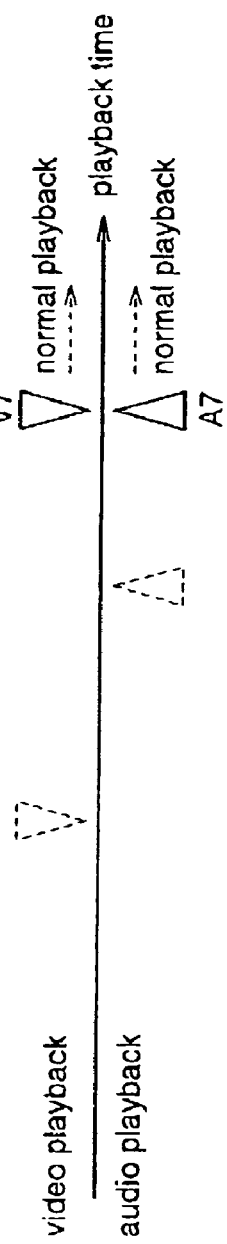

VIDEO/AUDIO PLAYBACK APPARATUS AND VIDEO/AUDIO PLAYBACK METHOD

FIELD OF THE INVENTION

The present invention relates to an apparatus and a method for reading and reproducing a coded video/audio stream from a random accessible recording medium and, more particularly, to a video/audio synchronous playback technique.

BACKGROUND OF THE INVENTION

In recent years, DVDs in which video and audio are digital-compressed and recorded have become widespread, and are widely used for easily playing various kinds of software such as movie and karaoke. A VTR which has been conventionally utilized played back such as a movie in the recorded order at the most as a function of playing a video. For a DVD, however, a function of playing a desired scene in a moment and the like can be provided. Further, while a program being broadcast can be simply viewed on TV in a prior art, the emergence of digital broadcasting enables viewers to answer quizzes at home by using a remote controller for a television when they are viewing a quiz show, for example. Moreover, when a drama is being viewed, profiles of actors on television can be displayed by merely pressing a button.

For such as the DVD and digital broadcasting, the MPEG (Moving Picture Experts Group) is used as an information compression technique for efficiently storing and transmitting video and audio. In MPEG, a construction of a signal used for multiplexing a plurality of digital signals which are constituents of digital contents such as video and audio into a bitstream is defined as a standard.

In this standard, a PCR (Program Clock Reference) or an SCR (System Clock Reference) which is time information for setting a value of an STC (System Time Clock) as a reference time on the decoder side in the MPEG system, to a value as intended on the encoder side, a PTS (Presentation Time Stamp) which is time information added for each unit of coding video or audio as well as time management information for playback and output, and a DTS (Decoding Time Stamp) which is time management information for decoding are coded into a bitstream, thereby performing synchronous playback with higher precision.

Here, a format of a video/audio stream for MPEG2 will be described with reference to FIG. 15. FIG. 15 is a diagram schematically illustrating a construction of the video/audio stream. In FIG. 15, a video/audio stream is constructed as a set of a video pack (V_PCK) and an audio pack (A_PCK). The V_PCK comprises a pack header and a video packet, and an SCR and the like are recorded in the pack header. The video packet further comprises a packet header and a video elementary stream. A stream ID, a DTS, a PTS and the like are recorded in the packet header and the video elementary stream comprises an I picture, a P picture, and a B picture which are bitstreams obtained by compressing digital video signals according to MPEG2. Then, the A_PCK and the V_PCK have the similar construction and there are some cases where the audio elementary stream contains a substream ID according to the audio compression method.

Further, according to a timing rule for realizing synchronous playback using time stamp, or a rule for memory amount defined for sequentially reproducing coded data, the system target decoder (STD) as shown in FIG. 16 is modeled.

FIG. 16 is a block diagram illustrating an STD according to the MPEG2-PS (Program Stream). An access unit of an audio elementary stream is defined as being instantaneously transmitted from an input buffer to a decoder at a time corresponding to tpn to be decoded, and this tpn is coded into a bitstream as a PTS. On the other hand, for the video elementary stream, the I picture (Intra Picture) and the P picture (Predictive Picture) are decoded prior to B picture (Bidirectionally Predictive Picture), and therefore a decode time does not coincide with a display time. Therefore, data of the I picture and the P picture are defined as being instantaneously transmitted from an input buffer to a decoder at a time corresponding to td1 to be decoded, and the td1 is coded into a bitstream as a DTS, and these data are displayed at a time indicated as the PTS.

Many of the conventional techniques relating to the MPEG is directed to synchronously reproduce the respective stream data into which signals are multiplexed as MPEG streams with higher precision, and as a technique which has an object other than obtaining synchronization, for example, like a playback apparatus disclosed in the Japanese Published Patent Application No. Hei. 8-298645, which discloses a playback apparatus which plays sub-videos a predetermined time period later after it simultaneously plays main videos and audios, and completes the playback of the sub-videos and then simultaneously plays main videos and audios again.

However, while DVD enables various playback functions to be handled, how the contents can be reproduced just depends on the intention of the content producer, and even for the digital broadcasting, the broadcast station or program producer must add additional information to the content data so that the viewers can utilize various services.

For example, it is assumed that a state of a lecture meeting in which materials are projected onto a screen using a liquid crystal projector or an OHP for presentation is photographed and recorded using a video recorder. The viewer who plays the recorded video sometimes wants to view the video which has been played before, such as the materials of the presentation or the posture of the presenter giving the lecture, instead of the video which is played in synchronization with audio, while normally hearing audio of such as the presenter's lecture. Further, in a case where a parent other than a photographer views the video which is obtained by photographing and recording his child's music program held in a kindergarten or a nursery school, the parent sometimes wants to selectively view the video of a portion which is played with his child being centered while normally hearing the audio such as music. Further, also when viewing a live sport such as baseball or soccer on TV, the viewer may sometimes want to view the video of a highlight scene which has been broadcast before again while hearing audio live as it is. When viewing a live news program and the like, the same thing can be said. In either case, since the portions which the respective viewers want to view are various, the viewers sometimes want to carefully view the video other than the video photographed by a photographer or the video provided by the broadcast station with the audio being played as it is, the viewers feel frustrated.

While a novel playback function can be provided to viewers using the data reproduction method disclosed in the above-described patent document, the sub-video is played a predetermined time period later than the main video in this playback function, and the viewers cannot freely make operation for playing the video without feeling stressful.

SUMMARY OF THE INVENTION

The present invention is made to solve the above-described problems and has for its object to provide a video/audio playback apparatus and a video/audio playback method capable of freely changing playback operations for only the video with the audio being normally played.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided a video/audio playback apparatus which reads a video/audio stream recorded in a random accessible recording medium, and reproduces the video/audio stream on the basis of a reference time and time management information which is embedded in each of a video stream and an audio stream which constitute the video/audio stream, and which comprises: a video operation switching circuit for indicating that a playback operation of the video stream is to be switched; a data reading circuit for reading a video/audio stream for playing an audio and a video/audio stream for playing a video from the recording medium on receiving the instruction for switching the video operation from the video operation switching circuit; a stream buffer for distinguishably storing the video/audio stream for playing audio and the video/audio stream for playing video which are read by the data reading circuit; a separation circuit for separating an audio stream and a video stream from the video/audio stream for playing audio and the video/audio stream for playing video, which are stored in the stream buffer, respectively; a counter for outputting a predetermined clock as a reference time on the basis of the time management information embedded in the video/audio stream for playing audio; an audio playback circuit for reproducing the audio stream separated from the video/audio stream for playing audio on the basis of the time management information embedded in the audio stream and the reference time; and a video playback circuit for reproducing the video stream separated from the video/audio stream for playing video on the basis of a reference time different from that for the audio playback circuit.

Therefore, the video/audio playback apparatus according to the present invention reproduces a video/audio stream for playing audio and a video/audio stream containing a picture frame required for the trick play individually, and reproduces the audio stream on the basis of the time management information embedded in the audio stream and a reference time which is set based on the time management information embedded in the audio stream, thereby enabling the trick play of only the video being performed with the audio being normally played, and improving the operability and convenience for the user.

According to a 2nd aspect of the present invention, in the video/audio playback apparatus of the 1st aspect, the video/audio stream is a stream into which the digital-compressed video and audio are multiplexed according to the MPEG format.

According to a 3rd aspect of the present invention, in the video/audio playback apparatus of the 1st aspect, the video operation switching circuit gives instructions for switching among normal playback for synchronously reproducing an audio stream and a video stream having the same time management information, video trick play for performing trick play of only a video stream, and video asynchronous playback for asynchronously reproducing an audio stream and a video stream each having time management information.

According to a 4th aspect of the present invention, in the video/audio playback apparatus of the 3rd aspect, the video playback circuit performs trick play of the video stream by using the video stream separated from the video/audio stream for playing video on receiving the instruction for the video trick play operation from the video operation switching circuit.

According to a 5th aspect of the present invention, in the video/audio playback apparatus of the 4th aspect, the data reading circuit reads video/audio streams for playing audios with higher priority than video/audio streams for playing videos, and continuously transmits the audio streams to the audio playback circuit so as not to interrupt audios which are to be played by the audio playback circuit when receiving the instruction for the video trick play operation from the video operation switching circuit.

According to a 6th aspect of the present invention, in the video/audio playback apparatus of the 5th aspect, the video playback circuit reproduces the video stream separated from the video/audio stream for playing video using a value obtained by subtracting, from the reference time, a differential value between the time management information embedded in the video stream which was outputted most recently at the video trick play and the reference time as of the time at which the video trick play is stopped, as a reference time for reading the video stream, when receiving the instruction for performing the video asynchronous playback halfway through the video trick play from the video operation switching circuit.

Therefore, in a case where a video asynchronous playback in which the audio stream and the video stream having the same time management information are asynchronously read is indicated in a state where the trick play of only the video stream is being performed, the video/audio playback apparatus according to the present invention calculates a differential value between the reference time as of the time at which the video asynchronous playback is indicated and the time management information embedded in the video stream which is being subjected to the trick play and displayed, and sets a value obtained by subtracting the differential value from the reference time as a reference time used for reading the video stream, and thereby can simultaneously reproduce the audio stream and the video stream having the different time management information from each other, and therefore a state where the trick play of only the video is being performed can be shifted to playing the audio and the video asynchronously by a desired time, thereby improving the operability and the convenience of the user.

According to a 7th aspect of the present invention, in the video/audio playback apparatus of the 6th aspect, the video playback circuit reproduces the video stream separated from the video/audio stream for playing audio on the basis of the time management information embedded in the video stream and the reference time when receiving the instruction for performing the normal playback operation halfway through the video asynchronous playback operation from the video operation switching circuit.

According to an 8th aspect of the present invention, in the video/audio playback apparatus of the 4th aspect, the video playback circuit reproduces the video stream of the video/audio stream for playing audio on the basis of the time management information embedded in the video stream and the reference time when the time management information embedded in the video stream which is being subjected to video trick play coincides with the reference time.

Therefore, in a case where the time management information embedded in the video stream which is being subjected to video trick play and displayed is identical to the time management information embedded in the audio stream being read in a state where the trick play of only the video stream is being performed, the video/audio playback apparatus according to the present invention reads the video stream separated from the video/audio stream for playing the audio on the basis of the reference time, and therefore the audio stream and the video stream having the same time management information can be synchronously read without performing a special operation, thereby improving the operability and convenience for the user.

According to a 9th aspect of the present invention, the video/audio playback apparatus of the 7th aspect or the 8th aspect comprises; a playback time display circuit for visually displaying one of a playback time of the audio which is played by the audio playback circuit and a playback time of the video which is played by the video playback circuit, or both of them.

According to a 10th aspect of the present invention, there is provided a video/audio playback method for reading a video/audio stream recorded in a random accessible recording medium, and reproducing the video/audio stream on the basis of time management information embedded in each of a video stream and an audio stream which constitute the video/audio stream and a predetermined reference time, and which comprises: reading a video/audio stream for playing an audio and a video/audio stream for playing a video from the recording medium; extracting a predetermined clock as a reference time on the basis of a predetermined time management information embedded in the video/audio stream for playing audio; and reproducing an audio stream of the video/audio stream for playing audio on the basis of the time management information embedded in the audio stream and the reference time, and performing trick play of a video stream using the video/audio stream for playing video.

Therefore, the video/audio playback apparatus according to the present invention reproduces a video/audio stream for playing audio and a video/audio stream containing a picture frame required for the trick play individually, and reproduces the audio stream on the basis of the time management information embedded in the audio stream and a reference time which is set based on the time management information embedded in the audio stream, thereby enabling the trick play of only the video being performed with the audio being normally played, and improving the operability and convenience for the user.

According to an 11th aspect of the present invention, the video/audio playback method of the 10th aspect comprises: stopping trick play of the video stream; obtaining a differential value between the time management information embedded in the video stream which was outputted most recently at the trick play of the video stream and the reference time as of the time at which the video trick play is stopped and subtracting the differential value from the reference time; and reproducing the video stream separated from the video/audio stream for playing video with using the subtraction value as a reference time for reproducing video stream According to a 12th aspect of the present invention, the video/audio playback method of the 10th aspect comprises reproducing the video stream of the video/audio stream for playing audio on the basis of the time management information embedded in the video stream and the reference time when the time management information embedded in the video stream displayed at the trick play of the video stream coincides with the reference time.

According to a 13th aspect of the present invention, the video/audio playback apparatus of the 1st aspect comprises a display video control circuit for displaying a display video which was outputted immediately before an instruction for switching a video operation, on a sub-screen which is other than a main screen onto which the video stream is reproduced, when receiving the instruction for switching the video operation from the video operation switching circuit.

According to a 14th aspect of the present invention, in the video/audio playback-apparatus of the 13th aspect, the display video control circuit displays, when receiving an instruction for switching a video operation from the video operation switching circuit in a state where the videos are displayed on the main screen and the sub-screen, the display video which was outputted onto the main screen immediately before the instruction for switching the video operation is received, on a new sub-screen.

According to a 15th aspect of the present invention, the video/audio playback apparatus of the 14th aspect further comprises a video operation selection circuit for selecting one of the sub-screens, wherein the display video control circuit switches between a video display on the sub-screen selected by the video operation selection circuit and the video display on the main screen and displays the respective videos when receiving an instruction for switching a video operation from the video operation switching circuit, and the video playback circuit reproduces a video stream so as to start playback from the switched display video on the main screen.

Therefore, the video/audio playback apparatus according to the present invention displays a display video being played on a main screen as a paused video on another screen, and starts playback operation from the paused video being displayed on the other screen according to a user's selection, and thereby the video which the user desires to carefully view can be freely displayed and played with the audio being normally played, thereby improving the operability and the convenience for the user.

According to a 16th aspect of the present invention, the video/audio playback method of the 10th aspect comprises performing the trick play of the video stream with the display video from which the trick play is started being displayed on another screen when performing the trick play of the video stream.

Therefore, the video/audio playback apparatus according to the present invention displays a display video being played on a main screen as a paused video on another screen, and starts playback operation from the paused video being displayed on the other screen according to a user's selection, and thereby the video which the user desires to carefully view can be freely displayed and played with the audio being normally played, thereby improving the operability and the convenience for the user.

BRIEF DESCRIPTION OF THE DRAWINGS

FIG. 8 is a diagram for explaining an operation of shifting from a state where reverse playback of only video is performed to video asynchronous playback to be performed.

FIG. 9 is a diagram for explaining an operation of starting playing video in synchronization with audio from video asynchronous playback.

DETAILED DESCRIPTION OF THE PREFERRED EMBODIMENTS

Hereinafter, an embodiment of the present invention will be described with reference to the drawings.

Figure 1:
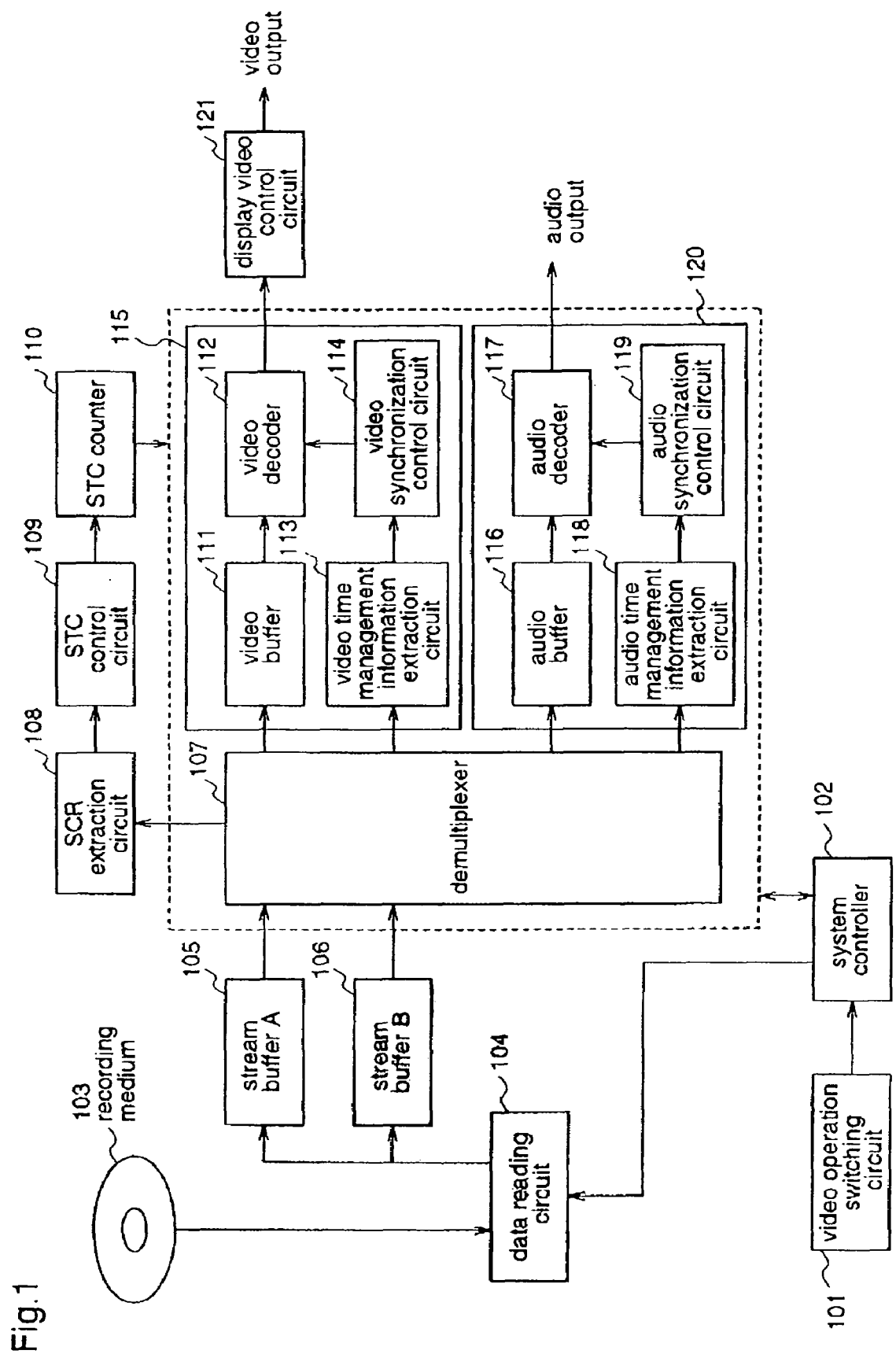
FIG. 1 is a block diagram illustrating a video/audio playback apparatus according to an embodiment of the present invention.

FIG. 1 is a block diagram illustrating a video/audio playback apparatus according to the embodiment of the present invention.

In FIG. 1, a video operation switching circuit 101 selects an operation of the video/audio playback apparatus and notifies a system controller 102 of operation codes corresponding to the respective operations.

The system controller 102 controls reproduction of a video/audio stream according to a predetermined operation code notified by the video operation switching circuit 101, and indicates various control codes to the respective circuits described below and controls states of the other respective circuits.

A recording medium 103 is a random accessible recording medium for storing video/audio streams, such as a CD, a DVD, an HDD or an SD card, in which the consecutive addresses are allocated to data, thereby enabling the storage position of data in the recording medium to be managed. Then, while in this embodiment the MPEG2-PS (Program Stream) will be exemplified as a video/audio stream, the video/audio stream may be a bitstream into which signals are multiplexed according to the other MPEG formats such as MPEG1 or MPEG2-TS (Transport Stream). Further, while the video/audio streams are sequentially recorded in a recording medium in the below description, the video/audio streams may be distributed at random in a recording medium. Further, the recording medium 103 may be a memory such as an SDRAM for temporarily storing program data for digital broadcasting.

A data reading circuit 104 reads the video/audio stream from a predetermined position in the recording medium 103, and writes the read video/audio stream into a stream buffer described later. The video/audio stream is read based on read position information which is an address allocated in the recording medium and which indicates from where in the recording medium 103 the video/audio stream is to be read, and read amount information indicating the amount of the video/audio streams to be read in one access. Then, the read amount information may be read end position information which is an address allocated in the recording medium and which indicates to where the video/audio stream are to be read.

Each of a stream buffer A 105 and a stream buffer B 106 is a memory such as an SDRAM for temporarily storing the video/audio streams read from the recording medium 103. An address for indicating write position information for the video/audio stream is allocated in each of the stream buffer A 105 and the stream buffer B 106 so as to manage the video/audio streams stored in the respective stream buffers. The stream buffer A 105 and the stream buffer B 106 may be memories which are physically different from each other, or an area in a single memory may be allocated between the stream buffer A 105 and the stream buffer B 106. Further, while in this embodiment the stream buffer A 105 and the stream buffer B 106 circularly and sequentially store video/audio streams as ring buffers, another data storage method may be used.

A demultiplexer 107 separates each of the video/audio streams held in the stream buffer A 105 and the stream buffer B 106 into a video stream and an audio stream and discriminates between the video stream and the audio stream according to the stream ID contained in the packet header and the sub-stream ID contained in the audio elementary stream. Moreover, the demultiplexer 107 extracts the SCR contained in the pack header of the video/audio stream and the DTS and PTS contained in the packet header thereof.

An SCR extraction circuit 108 holds the SCR extracted by the demultiplexer 107. An STC control circuit 109 controls an STC counter 110, and sets an initial value for the STC counter 110. The STC counter 110 generates a clock which is a reference time for reproducing the video/audio stream (hereinafter, referred to as "STC").

A video buffer 111 temporarily stores the video stream separated from the video/audio stream. The video decoder 112 decodes the video stream, and reproduces and outputs the decoded video stream. A video time management information extraction circuit 113 holds the DTS and the PTS of the video stream extracted by the demultiplexer 107. A video synchronization control circuit 114 controls an operation timing for the video decoder 112 on the basis of the DTS and the PTS for the video stream using a clock outputted from the STC counter 110 as a reference.

An audio buffer 116 temporarily stores the audio stream separated from the video/audio stream. The audio decoder 117 decodes the audio stream, and reproduces and outputs the decoded audio stream. An audio time management information extraction circuit 118 holds the PTS of the audio stream extracted by the demultiplexer 107. An audio synchronization control circuit 119 controls an operation timing for the audio decoder 117 on the basis of the PTS for the audio stream using a clock outputted from the STC counter 110 as a reference.

A display video control circuit 121 holds a video signal which is played back and outputted by the video decoder 112, and further superimposes the held video signal on a video signal which is played back and outputted by the video decoder 112 and outputs and displays the superimposed video signal, according to the instruction from the system controller 102.

Next, a configuration and an operation of the video operation switching circuit 101 will be described with reference to FIGS. 10 and 11.

Figure 10:
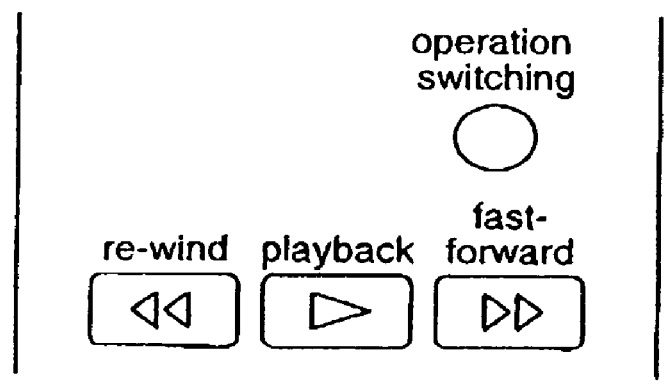
FIG. 10 is a diagram illustrating a portion of a remote controller as a video operation switching circuit according to the embodiment of the present invention.
Figure 11:
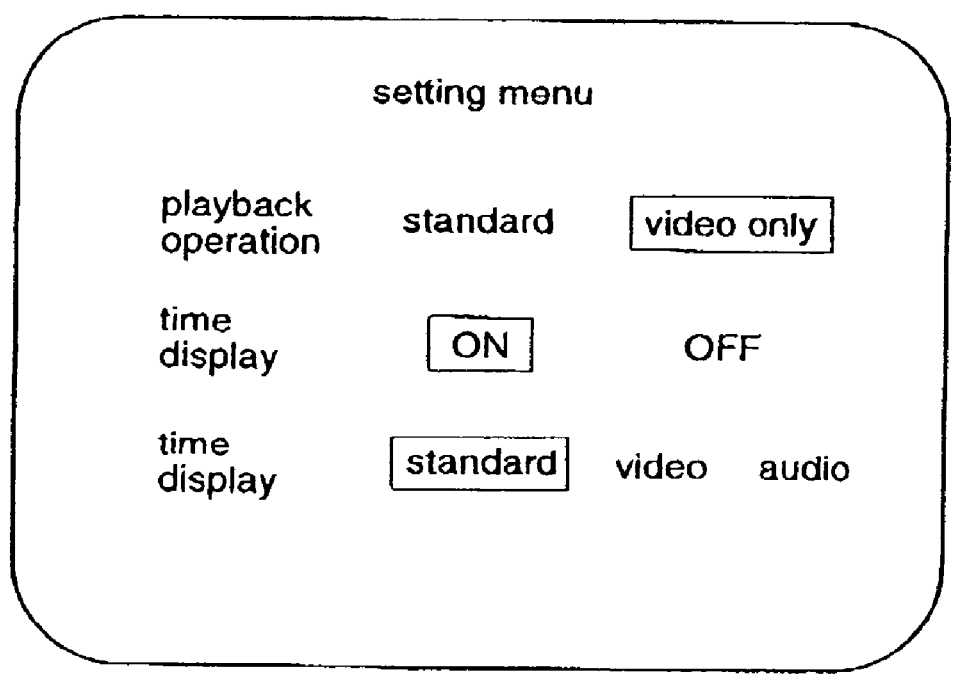
FIG. 11 is a diagram illustrating a setting menu for setting operations of the video/audio playback apparatus according to the embodiment of the present invention.

FIG. 10 is a block diagram illustrating a portion of a remote controller in a case where the video operation switching circuit 101 is realized as the remoter controller. The video operation switching circuit 101 has a fast-forward button, a re-wind button, a playback button, and an operation switching button. Generally, by pressing the playback button, normal playback in which the video and the audio are synchronized can be performed, and further a trick play operation such as a fast-forward playback and a reverse playback can be performed by pressing the fast-forward button and the re-wind button during the normal playback. Here, by pressing the operation switching button, an operation performed when the fast-forward button or the re-wind button is pressed is an operation of performing the fast-forward playback or the reverse playback of only the video while the audio is kept being normally played. In this embodiment, this trick play operation is referred to as video trick play. Further, when the playback button is pressed halfway through the video trick play, the operation is such that the video is played with the video being delayed or forwarded by a predetermined time period as compared to the audio. In this embodiment, this playback operation is referred to as video asynchronous playback.

Then, buttons for operating normal playback and playback of only the video may be separately provided with no operation switching button being provided. Further, the video operation switching circuit 101 may have a setting menu on a screen for video display as shown in FIG. 11, and a video playback operation may be selected from the setting menu.

Next, an operation of the video/audio playback apparatus constructed as described above will be described as to a normal playback operation, an operation of performing video trick play shifted from the normal playback, an operation of performing video asynchronous playback shifted from the video trick play, and an operation of performing the normal playback shifted from the video asynchronous playback.

A. An Operation for Normal Playback

Initially, an operation of normal playback will be described.

When a user selects normal playback using the video operation switching circuit 101 in a state where the video/audio playback apparatus does not perform playback operation, the system controller 102 identifies video/audio streams as a target to be reproduced in the recording medium 103, and calculates the read position and the amount to be read in the recording medium 103. The system controller 102 clears data stored in the stream buffer A 105, and initializes the write position in the stream buffer A 105, and then notifies the data reading circuit 104 of the read position, the amount to be read, and the write position in the stream buffer A 105 for the video/audio stream as the target to be reproduced. Then, a method for identifying the video/audio stream as the target to be reproduced is defined in detail according to the video CD standards or DVD standards, and the method will not be described here.

When receiving the above notification from the system controller 102, the data reading circuit 104 reads the video/audio streams by a prescribed amount to be read from a prescribed read position in the recoding medium 103, and writes the video/audio streams into a prescribed write position in the stream buffer A 105.

When the prescribed amount of data are stored in the stream buffer A 105, the system controller 102 instructs the demultiplexer 107 to start decoding.

When receiving the instruction for starting decoding, the demultiplexer 107 reads the video/audio stream stored in the stream buffer A 105, and separates the video/audio stream into a video stream and an audio stream by identifying a stream ID and a sub-stream ID embedded in the stream, and outputs the video stream and the audio stream to the video buffer 111 and the audio buffer 116, respectively. Further, the demultiplexer 107 extracts the SCR embedded in the video/audio stream and outputs the SCR to the SCR extraction circuit 108, and extracts the DTS and the PTS embedded in the video stream and outputs the DTS and the PTS to the video time management information extraction circuit 113, and extracts the PTS embedded in the audio stream and outputs the PTS to the audio time management information extraction circuit 118.

The STC control circuit 109 sets a value of the SCR held in the SCR extraction circuit 108 as an initial value for the STC counter 110, and the STC counter 110 outputs the STC to the demultiplexer 107, the video synchronization control circuit 114, and the audio synchronization control circuit 119.

The video synchronization control circuit 114 instructs the video decoder 112 to decode the video stream when the value of the DTS held in the video time management information extraction circuit 113 coincides with the value of the STC outputted from the STC counter 110, and the video decoder 112 decodes the video stream held in the video buffer 111 on receiving the instruction. Further, the video synchronization control circuit 114 instructs the video decoder 112 to output the video when the value of the PTS held in the video time management information extraction circuit 113 coincides with the value of the STC outputted from the STC counter 110, and the video decoder 112 outputs the decoded video stream on receiving the instruction.

The audio synchronization control circuit 119 instructs the audio decoder 117 to decode the audio stream and output the decoded audio stream when the value of the PTS held in the audio time management information extraction circuit 118 coincides with the value of the STC outputted from the STC counter 110, and the audio decoder 117 decodes audio stream held in the audio buffer 116 and outputs the decoded audio stream on receiving the instruction.

By performing the above-described operation, normal playback in which the video and the audio are synchronized is performed for the desired video/audio stream.

B. A Method for Managing Data Storage in Stream Buffer A 105

Hereinafter, a method for managing data storage in the stream buffer A 105 in the video/audio playback apparatus according to the embodiment will be described.

When the data reading circuit 104 reads a video/audio stream from the recording medium 103, and writes the video/audio stream into the stream buffer A 105, the system controller 102 updates the read position in the recording medium 103 and write position in the stream buffer A 105, and updates the state of space areas in the stream buffer A 105. When the stream buffer A 105 has a predetermined amount of space areas, the system controller 102 calculates the amount of video/audio stream to be read subsequently and notifies the data reading circuit 104 of the read position in the recording medium 103, write position in the stream buffer A 105 and the amount to be read.

Further, the demultiplexer 107 reads the video/audio stream from the stream buffer A 105 at prescribed intervals on the basis of the STC outputted from the STC counter 110 after the decoding is started, and notifies the system controller 102 that the video/audio stream is read. The system controller 102 updates the read position in the recording medium 103 and the write position in the stream buffer A 105 on receiving the notification, and updates the state of the space areas in the stream buffer A 105. When the stream buffer A 105 has a predetermined amount of space areas, the system controller 102 calculates the amount of video/audio stream to be read subsequently, and notifies the data reading circuit 104 of the read position in the recording medium 103, the write position in the stream buffer A 105, and the amount to be read.

Figure 2A:
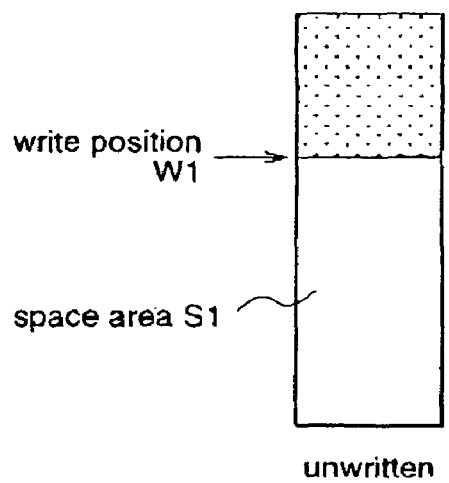
FIG. 2 is a schematic diagram illustrating an internal state of a stream buffer in writing video/audio streams into the stream buffer.
Figure 2B:
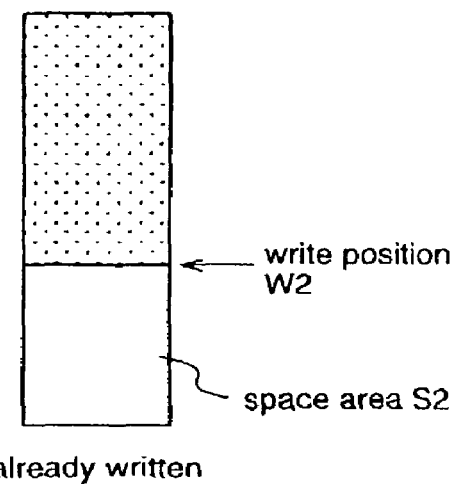
Figure 3A:
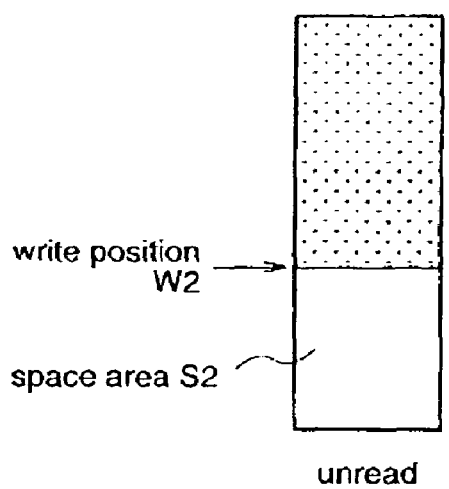
FIG. 3 is a schematic diagram illustrating an internal state of a stream buffer in reading video/audio streams from the stream buffer.
Figure 3B:
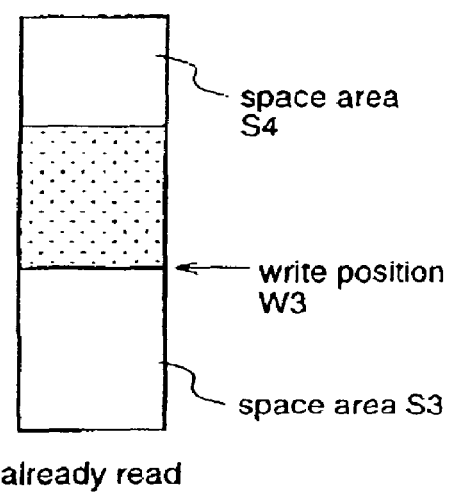

The above-described operation will be described with reference to FIGS. 2 and 3. FIGS. 2 and 3 are schematic diagrams illustrating the internal states of the stream buffer A 105. In a state where the stream buffer A 105 has a spare area S1 as shown in FIG. 2(a), when the video/audio stream is written from the write position W1, the subsequent data write position and the space area are updated respectively, and the state of the stream buffer A 105 is such that the space area is S2 and the write position is W2 as shown in FIG. 2(b). In such a state, that is, in a state shown in FIG. 3(a), when the demultiplexer 107 reads data, the space area S2 is updated and the state of the stream buffer A 105 is such that the stream buffer A 105 has space areas S3 and S4 as shown in FIG. 3(b).

Thereafter, the system controller 102, the demultiplexer 107 and the data reading circuit 104 repeat the above-described operations, respectively, thereby managing the data storage in the stream buffer A 105.

C. An Operation for Shifting from the Normal Playback Operation to Reverse Playback as a Video Trick Play Operation Next, an operation performed in a case where a user selects reverse playback as a video trick play operation using the video operation switching circuit 101 during the normal playback operation will be described.

FIG. 7 is a diagram schematically illustrating an asynchronization between the playback times of the video stream and the audio stream which are reproduced by the video playback circuit 115 and the audio playback circuit 120, respectively. The abscissa axis indicates reproduction times for the video/audio stream, and V1 and A1 indicate reproduction position of the video stream and reproduction position of the audio stream, respectively.

Figure 7A:
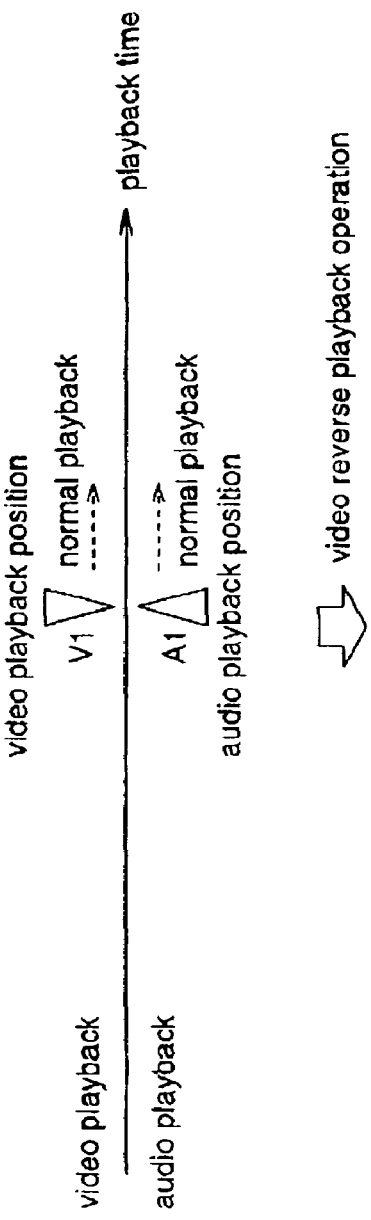
FIG. 7 is a diagram for explaining an operation for reverse playback of only the video, which is shifted from normal playback.

As shown in FIG. 7(a), at the normal playback, the video stream and the audio stream having the same time management information are synchronously reproduced. Here, when reverse playback operation is selected using the video operation switching circuit 101, the demultiplexer 107 stops the outputs of the video stream, and the DTS and the PTS embedded in the video stream. Further, the system controller 102 performs control so that the video decoder 112 stops decoding the video stream, the video frame which was outputted most recently remains outputted and displayed, and the video stream stored in the video buffer 111 is initialized.

The system controller 102 obtains the PTS of the video frame which was outputted most recently from the video time management information extraction circuit 113, calculates the read position and the amount to be read in the recording medium 103 for the video/audio stream containing I picture immediately before the video frame which was reproduced and outputted most recently on the basis of the PTS, and notifies the data reading circuit 104 of the read position, the amount to be read, and the write position in the stream buffer B 106.

The data reading circuit 104 reads the video/audio stream containing the I picture immediately before the most recently outputted video frame by a prescribed amount to be read from a prescribed read position in the recording medium 103, and writes the video/audio stream into a prescribed write position in the stream buffer B 106.

When the data reading circuit 104 writes the video/audio stream into the stream buffer B 106, the system controller 102 updates the read position in the recording medium 103 and the write position in the stream buffer B 106 which are previously calculated.

D. An Update of a Read Position in a Recording Medium

Figure 4A:
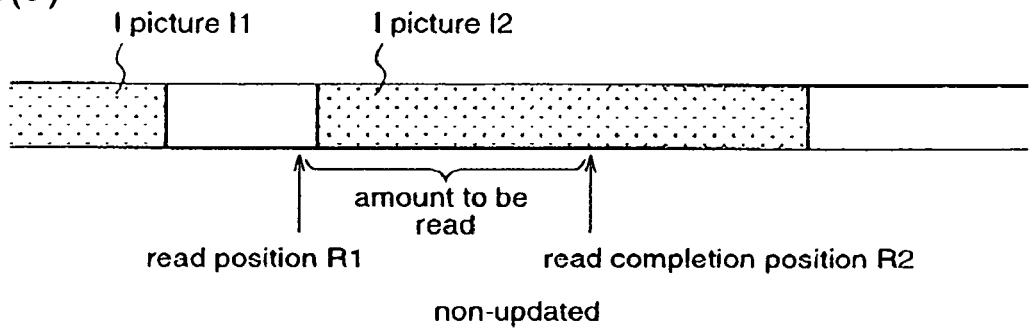
FIG. 4 is a schematic diagram for explaining an update of a read position of the video/audio stream in the recording medium.
Figure 4B:
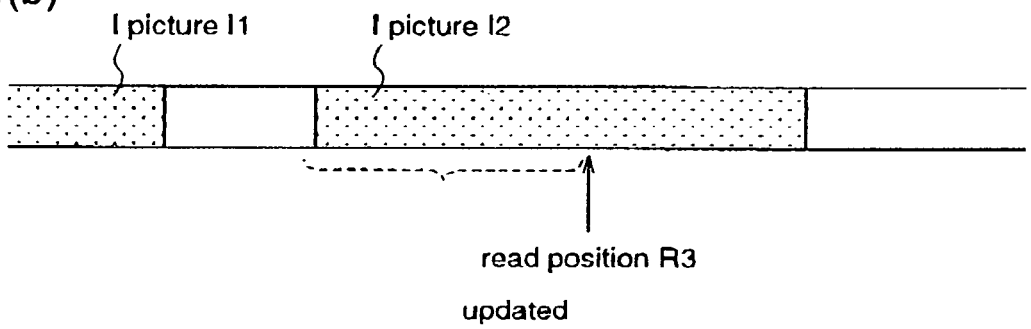
Figure 5A:
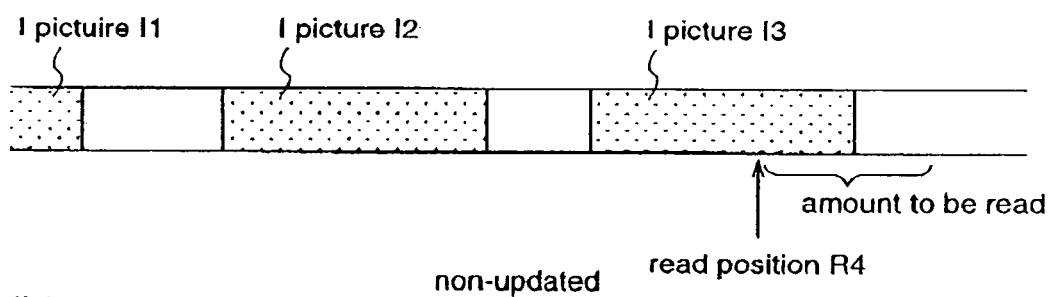
FIG. 5 is a schematic diagram for explaining an update of a read position of the video/audio stream in the recording medium.
Figure 5B:
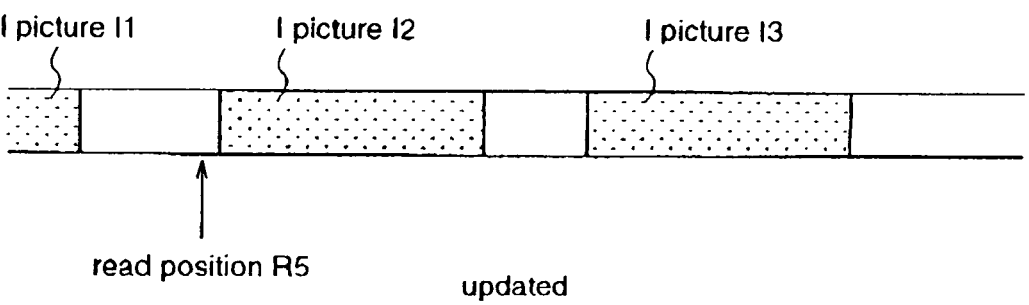
Figure 6A:
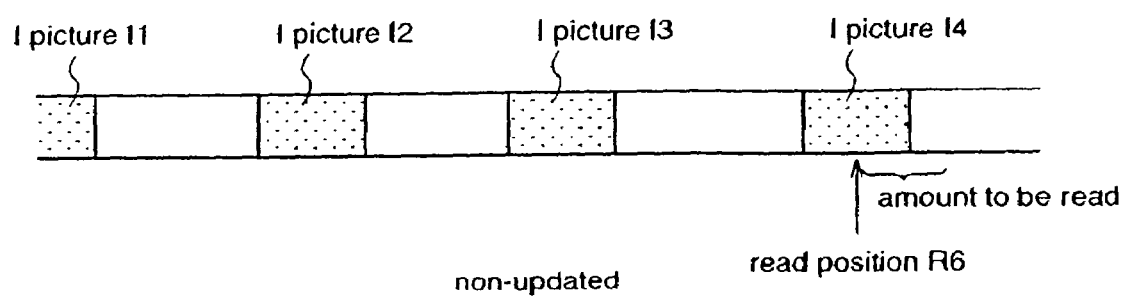
FIG. 6 is a schematic diagram for explaining an update of a read position of the video/audio stream in the recording medium.
Figure 6B:
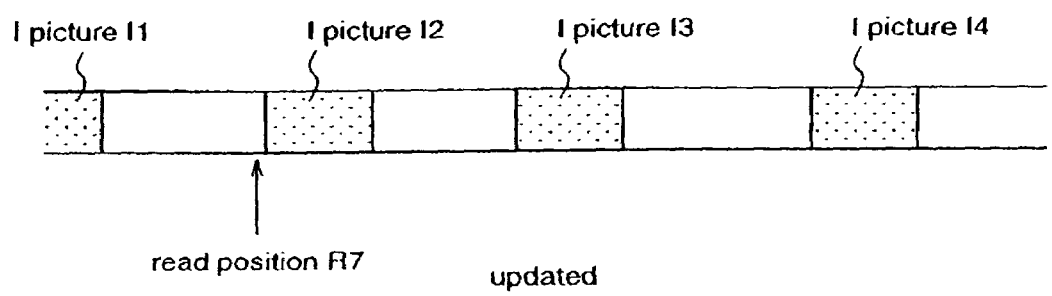

Here, the update of the read position in the recording medium 103 which is performed by the system controller 102 will be described with reference to FIGS. 4, 5, and 6. FIGS. 4, 5, and 6 are schematic diagrams illustrating video/audio streams in the recording medium, and FIGS. 4(a), 5(a), and 6(a) each shows a state before update of the read position while FIGS. 4(b), 5(b), and 6(b) each shows a state in which the read position has been updated.

In updating the read position, in a case where when the video/audio stream is read from the read position R1 before the read position is updated, I picture I2 has not been completely read as shown in FIG. 4(a), the position immediately after the position R2 at which the most recent readout of the video/audio stream was completed is set as a new read position R3 as shown in FIG. 4(b).

On the other hand, in a case where the readout of I picture I3 is completed in reading video/audio stream from the read position R4 before the update of the read position as shown in FIG. 5(a), a record position in the recording medium 103 from which the whole of I picture I2 timewise before the already read I picture I3 can be read is set as a new read position R5 as shown in FIG. 5(b). At this time, when I picture to be read is determined, some pieces of I pictures may be skipped in consideration of the playback speed for reverse playback. For example, as shown in FIG. 6, in a case where the readout of I picture I4 is completed in reading the video/audio stream from the read position R6 before the update of the read position, I picture I3 may be skipped and a record position in the recording medium 103 from which the whole of I picture I2 in the recording medium 103 can be read may be set as a new read position R7.

Next, the demultiplexer 107 reads video/audio stream stored in the stream buffer B 106, and identifies the stream ID embedded in the stream, and thereby separates the video stream and outputs the video stream to the video buffer 111.

The video decoder 112 captures video stream containing I picture held in the video buffer 111, and decodes and outputs only the I picture. The video decoder 112 outputs the I picture for a predetermined time period, and then requests the demultiplexer 107 to output the subsequent video stream.

Then, data stored in the stream buffer B 106 are managed in a method similar to the above described method for the stream buffer A 105. That is, the demultiplexer 107 notifies the system controller 102 that it reads the video/audio stream in the stream buffer B 106, and the system controller 102 updates the space areas in the stream buffer B 106. When the stream buffer B 106 has spare areas, the system controller 102 calculates the amount of video/audio stream to be read subsequently, notifies the data reading circuit of the read position, the amount to be read, and the write position, and instructs the data reading circuit to write the video/audio stream into the stream buffer B 106.

The demultiplexer 107 reads the video/audio stream stored in the stream buffer B 106, and identifies the stream ID embedded in the stream, and thereby separates the video stream and outputs the video stream to the video buffer 111.

The system controller 102 manages video/audio stream for playing audio which are stored in the stream buffer A 105 as well as processes the video stream as described above. The audio stream which is separated from the video/audio stream for playing audio by the demultiplexer 107 is continuously and normally reproduced on the basis of the STC outputted from the STC counter 110 and the time management information embedded in the audio stream without being influenced by the processing of the video stream. Then, the system controller 102 controls the speed at which the demultiplexer 107 reads the video/audio streams from the stream buffer A 105 so as to prevent the video/audio streams for playing audio to be held in the stream buffer A 105 from being absent, and the video/audio stream may be written into the stream buffer A 105 with higher priority than the video/audio stream is written into the stream buffer B 106.

Figure 7B:
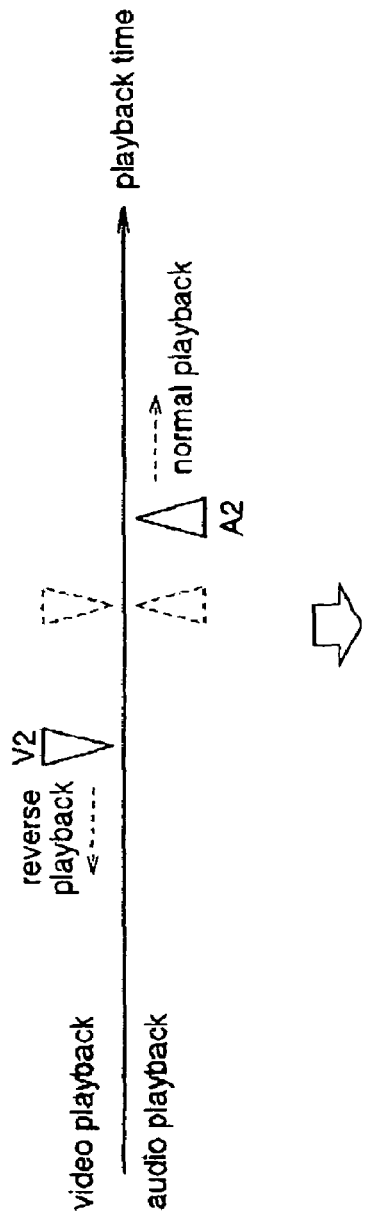
Figure 7C:
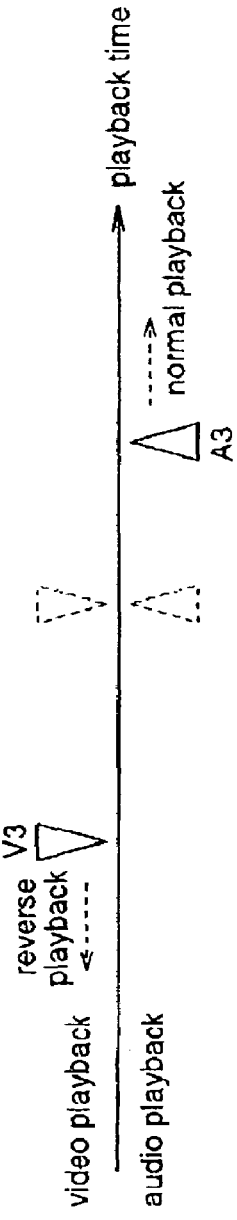

The above-described operation enables the video trick play in which the reverse playback for video stream is performed with the audio stream being normally reproduced. For example, as shown in FIG. 7(b), while the audio stream at A2 is normally reproduced, the video stream at V2 can be reproduced. Further, when the video trick play further proceeds from the state shown in FIG. 7(b), the video stream at V3 can be reproduced while the audio stream at A3 is normally reproduced as shown in FIG. 7(c).

Then, while the video reverse playback is taken as an example in the above description, in the case of the video fast-forward playback, I picture in the video stream are read in the forward direction, thereby realizing an operation similar to the operation described for the video reverse playback. Further, operations for video slow playback, video frame advance playback, video pause or the like can be performed independently of the normal playback of audio similarly to the video reverse playback.

E. An Operation for Shifting from a State where Video Reverse Playback as Video Trick Play is Performed Independently of the Audio Playback to Video Asynchronous Playback Next, an operation for shifting from a state where video trick play in which reverse playback of video is performed independently of playback of audio as described above to video asynchronous playback for playing video to be performed will be described.

FIG. 8 is a diagram schematically illustrating an asynchronization between the playback times of the video stream and the audio stream which are reproduced by the video playback circuit 115 and the audio playback circuit 120, respectively. As shown in FIG. 8(a), when a user selects a video asynchronous playback operation using the video operation switching circuit 101 halfway through the video trick play in which reverse playback operation of only video stream is performed, the demultiplexer 107 stops the outputs of the video stream, and the DTS and the PTS embedded in the video stream. Further, the system controller 102 performs control so that the video decoder 112 stops decoding the video stream, the video frame which was outputted most recently remains outputted and displayed, and the video stream stored in the video buffer 111 is initialized.

The system controller 102 obtains the PTS of the video frame which was outputted most recently at the reverse playback from the video time management information extraction circuit 113, and calculates the read position and the amount to be read in the recording medium 103 for the video/audio stream containing the PTS. Further, the system controller 102 clears data stored in the stream buffer B 106 to initialize the write position in the stream buffer B 106, and notifies the data reading circuit 104 of the read position, the amount to be read, and the write position. Further, the system controller 102 obtains a reference time STC at the time when the reverse playback operation processing is stopped from the STC counter 110, calculates a difference between the STC and the PTS of video frame which was outputted most recently at the reverse playback (ΔSTC), and outputs the difference to the video synchronization control circuit 114.

When the data reading circuit 104 is notified of the read position and the like from the system controller 102, the data reading circuit 104 reads the video/audio stream from a prescribed read position in the recording medium 103 by a prescribed amount to be read, and writes the video/audio stream into a prescribed write position in the stream buffer B 106.

The demultiplexer 107 reads the video/audio stream stored in the stream buffer B 106, and identifies the stream ID embedded in the stream, and thereby separates the video stream and outputs the video stream to the video buffer 111, and outputs the DTS and the PTS embedded in the video stream to the video time management information extraction circuit 113.

When a value obtained by subtracting the ΔSTC from a value of the STC outputted from the STC counter 110 coincides with the value of the DTS held in the video time management information extraction circuit 113, the video synchronization control circuit 114 instructs the video decoder 112 to start the decoding. The video decoder 112 decodes the video stream in video buffer 111 on receiving the instruction. Further, when a value obtained by subtracting the ΔSTC from the value of the STC outputted from the STC counter 110 coincides with the value of the PTS held in the video time management information extraction circuit 113, the video synchronization control circuit 114 instructs the video decoder 112 to output the video, and the video decoder 112 outputs the decoded video stream on receiving the instruction.

The system controller 102 manages video/audio stream for playing audio which are stored in the stream buffer A 105 as well as processes the video stream as described above. The audio stream which is separated from the video/audio stream for playing audio by the demultiplexer 107 is continuously and normally played on the basis of the STC outputted from the STC counter 110 and the time management information embedded in the audio stream without being influenced by the processing of the video stream. Then, the system controller 102 controls the speed at which the demultiplexer 107 reads the video/audio streams from the stream buffer A 105 so as to prevent the video/audio streams for playing audio to be held in the stream buffer A 105 from being absent, and the video/audio stream may be written into the stream buffer A 105 with higher priority than the video/audio stream is written into the stream buffer B 106.

In the above-described operation, the video trick play in which the reverse playback of only the video stream is performed independently of the normal playback of the audio stream can be shifted to the video asynchronous playback in which the video stream and the audio stream are asynchronously played back by an arbitrary time, thereby performing the video asynchronous playback. That is, it is possible to simultaneously playback the video stream and the audio stream having different time management information from each other. For example, as shown in FIG. 8(b), while the video stream positioned at V4 is reproduced, the audio stream positioned at A5 can be reproduced. When the playback operation further proceeds from the state shown in FIG. 8(b), the video stream positioned at V5 is reproduced and the audio stream positioned at A6 can be reproduced with maintaining asynchronization between the playback times of the video stream and the audio stream as shown in FIG. 8(c).

Then, while in this embodiment an operation for shifting from a state where the reverse playback of only video is performed with the audio being normally played to the video playback to be performed is taken as an example, an operation of starting normal playback from a video pause state, or an operation of starting the playback of only the video at an arbitrary position by an operation such as video skip playback or video time search can be similarly realized.

F. An Operation of Shifting from a State of Video Asynchronous Playback to a Normal Playback Operation Next, an operation for shifting from a state of the video asynchronous playback in which a video is played a predetermined time later than an audio is played as described above to a state of normal playback in which a video is played in synchronization with an audio to be performed again will be described.

FIG. 9 is a diagram schematically illustrating an asynchronization between the playback times of the video stream and the audio stream which are reproduced by the video playback circuit 115 and the audio playback circuit 120, respectively. As shown in FIG. 9(a), when a user selects normal playback operation using the video operation switching circuit 101 halfway through reproducing the video stream and the audio stream asynchronously by an arbitrary time, the demultiplexer 107 stops the outputs of the video stream read from the stream buffer B 106, and the DTS and the PTS embedded in the video stream. Further, the system controller 102 performs control so that the video decoder 112 stops decoding the video stream, the video frame which was outputted most recently remains outputted and displayed, and the video stream stored in the video buffer 111 is initialized.

The system controller 102 stops reproducing video stream when receiving the instruction for the video playback start operation from the video operation switching circuit 101. The demultiplexer 121 stops outputs of the video stream, and the DTS and the PTS embedded in the video stream. The system controller 102 performs control so that the video decoder 112 stops decoding the video stream, the video frame which was outputted most recently remains outputted and displayed, and the video stream stored in the video buffer 111 is initialized The system controller 102 and the data reading circuit 104 continuously perform writing into the stream buffer A 105.

The demultiplexer 107 outputs the video stream separated from the video/audio stream which is continuously read from the stream buffer A 105 to the video buffer 111 again, and outputs the DTS and the PTS embedded in the video stream to the video time management information extraction circuit 113.

Thereafter, the normal playback operation in which the audio stream and video stream are synchronized as described above is performed and thereby the normal playback in which a video is played in synchronization with an audio can be shifted and performed from the state of the video asynchronous playback in which a video is played a predetermined time later than an audio is played as shown in FIGS. 9(b) and 9(c).

Then, when the playback time of the video overtakes that of the audio in a state where the fast-forward playback or the reverse playback for the video is being performed independently of the playback of the audio, the playback of the video can be started in synchronization with the playback of the audio by the above-described operation.

G. An Operation for Selecting Video Pause as a Video Trick Play Operation to Display Another Screen During Normal Playback Operation Next, an operation performed in a case where a user selects video pause as a video trick play operation using the video operation switching circuit 101 to display another screen during the normal playback operation will be described.

Figure 17:
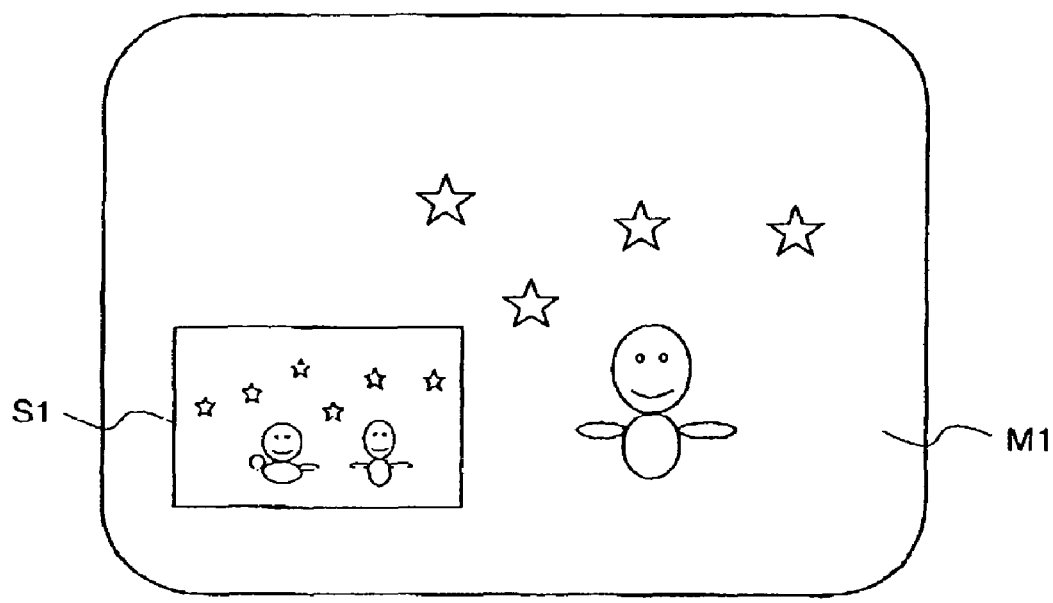
FIG. 17 is a diagram illustrating a monitor screen which displays video signals during video pause operation.
Figure 18:
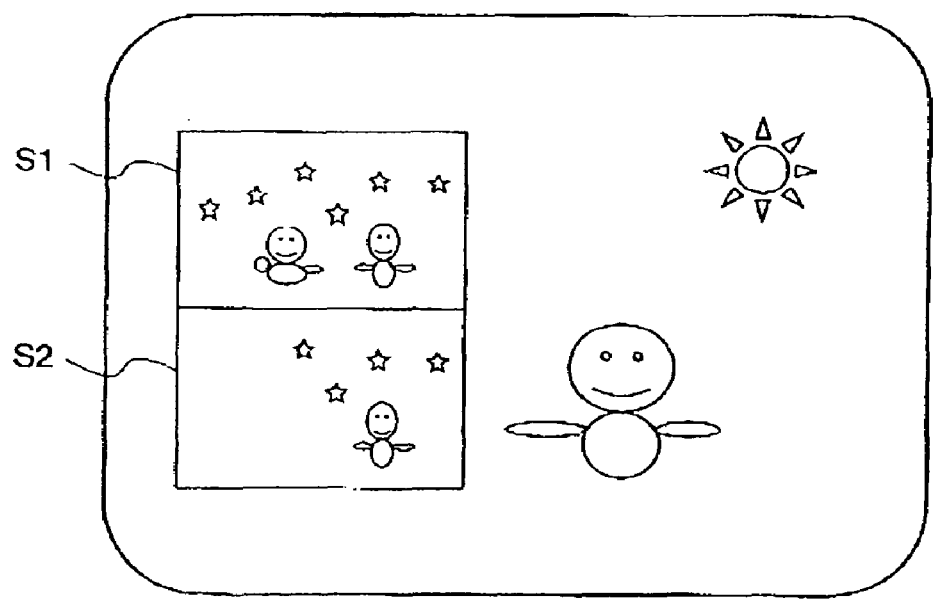
FIG. 18 is a diagram illustrating a monitor screen which displays video signals during video pause operation.
Figure 19:
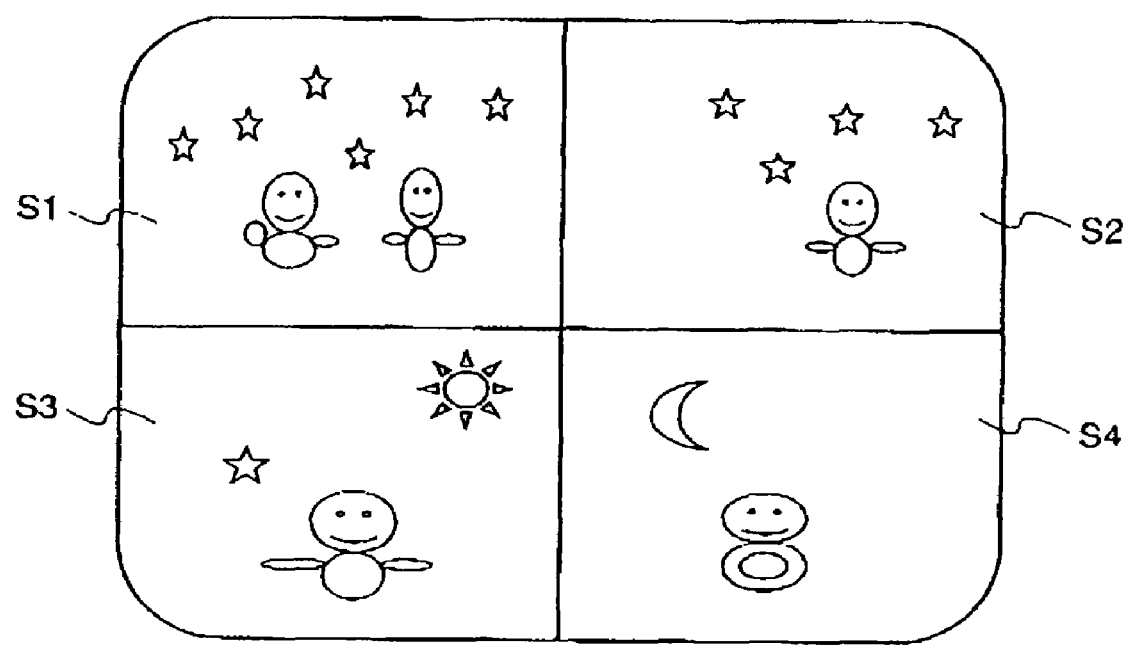
FIG. 19 is a diagram illustrating a monitor screen which displays video signals during video pause operation.

FIGS. 17 to 19 are diagrams illustrating monitor screens during video pause operation.

When a user selects video pause operation using the video operation switching circuit 101, the display video control circuit 121 holds the video signal which was outputted by the video decoder 112 most recently, and composites the held video and video signals which are played back and outputted by the video decoder 112 to output the resultant for display. Thereby, the video displayed when the video pause operation is selected is displayed on a sub-screen S1 with the normal playback operation being continued on a main screen M1 on the monitor screen as shown in FIG. 17.

Further, as shown in FIG. 17, when a user further selects the video pause operation in a state where the normal playback is performed on the main screen M1 with the paused video being displayed on the sub-screen S1 in the video pause operation, the display video control circuit 121 additionally displays the video which was outputted onto the main screen M1 immediately before the video pause operation as a new sub-screen S2. Thereby, a plurality of sub-screens S1 and S2 are displayed together with the main screen M1 on the monitor screen as shown in FIG. 18. When the plurality of sub-screens are displayed, the whole monitor screen may be divided into sub-screens S1, S2, S3 and S4 to be displayed as shown in FIG. 19.

Further, in such as a state shown in FIG. 18, when the user selects the sub-screen S1 from the displayed sub-screens S1 and S2 using a video operation selection circuit not shown and further indicates the video normal playback or the video trick play using the video operation switching circuit 101, the displayed image is switched between the main screen M1 and the sub-screen S1, and the video normal playback or the video trick play is started on the main screen M1 from the paused image which has been displayed on the sub-screen S1 which is selected, and the image which has been played on the main screen M1 immediately before the displayed image is switched is displayed as paused image on the sub-screen S1.

Then, while the video pause is taken as an example in the above description, another screen can be displayed for the video fast-forward playback, video reverse playback, video slow playback, video frame advance playback and the like in a manner similar to the video pause.

As described above, the video/audio playback apparatus according to this embodiment reproduces a video/audio stream for playing audio and a video/audio stream containing a picture frame required for the trick play individually, and reproduces the audio stream on the basis of the time management information embedded in the audio stream and a reference time which is set based on the time management information embedded in the audio stream, thereby enabling the trick play of only the video being performed with the audio being normally played, and improving the operability and convenience for the user.

Further, in a case where a video asynchronous playback in which the audio stream and the video stream having the same time management information are asynchronously reproduced is indicated in a state where the trick play of only the video stream is being performed, the video/audio playback apparatus according to this embodiment calculates a differential value between the reference time as of the time at which the video asynchronous playback is indicated and the time management information embedded in the video stream which is being subjected to the trick play and displayed, and sets a value obtained by subtracting the differential value from the reference time as a reference time used for reproducing the video stream, and therefore a state where the trick play of only the video is being performed can be shifted to playing the audio and the video asynchronously by a desired time, thereby improving the operability and the convenience of the user.

Moreover, in a case where the time management information embedded in the video stream which is being subjected to video trick play and displayed is identical to the time management information embedded in the audio stream being reproduced in a state where the trick play of only the video stream is being performed, the video/audio playback apparatus according to this embodiment reproduces the video stream separated from the video/audio stream for playing the audio on the basis of the reference time, and therefore the audio stream and the video stream having the same time management information can be synchronously reproduced without performing a special operation, thereby improving the operability and convenience for the user.

Further, in the video/audio playback apparatus according to the present invention, a display video is displayed on another screen, from which the playback is started, and thereby a video which a user desires to carefully view can be freely displayed and played with the audio being normally played, thereby improving the operability and the convenience for the user.

Figure 12:
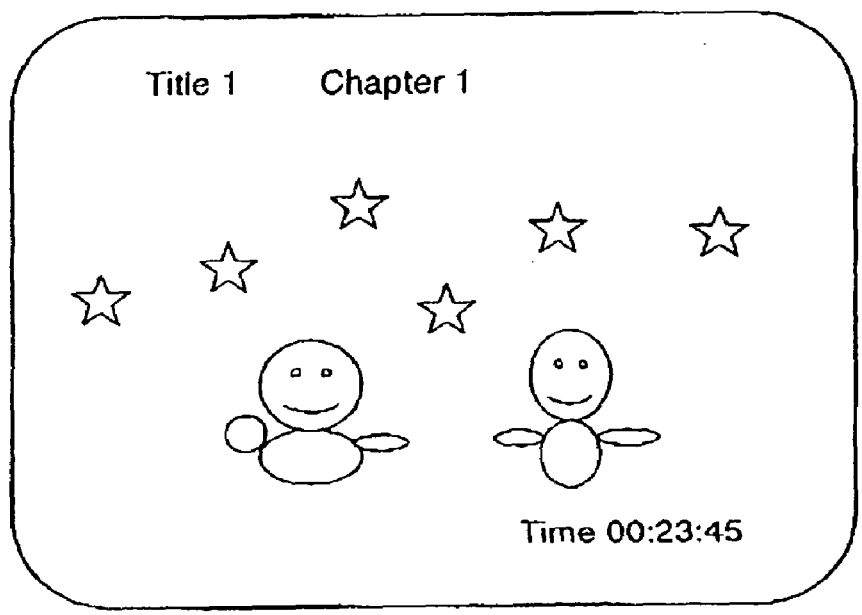
FIG. 12 is a diagram illustrating a monitor screen which displays video signals outputted from the video/audio playback apparatus according to the embodiment of the present invention.
Figure 13:
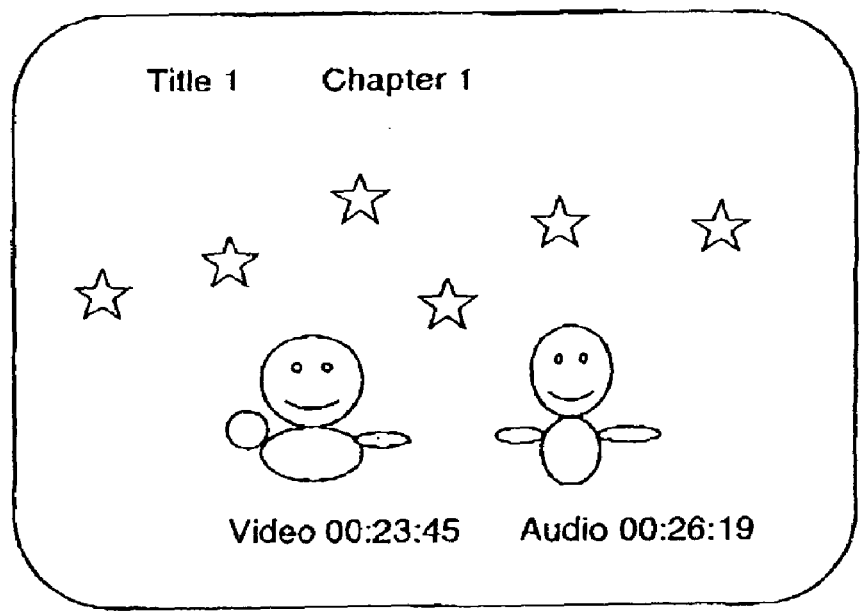
FIG. 13 is a diagram illustrating a monitor screen which displays video signals outputted from the video/audio playback apparatus according to the embodiment of the present invention.
Figure 14:
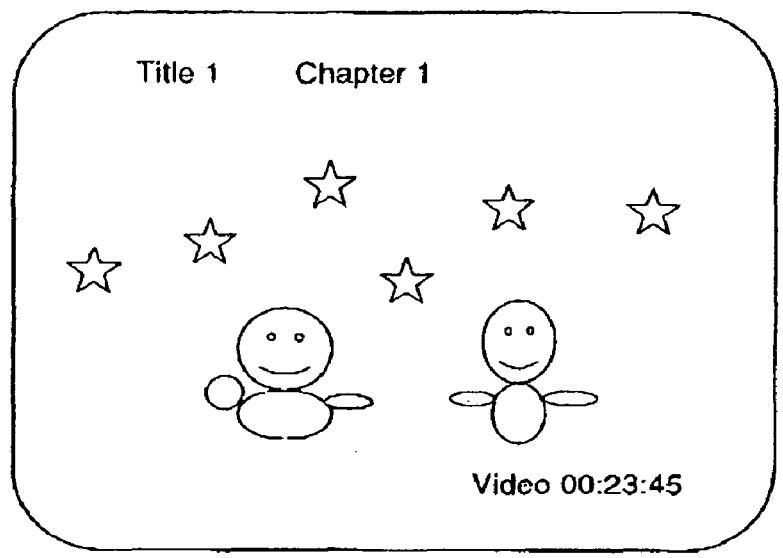
FIG. 14 is a diagram illustrating a monitor screen which displays video signals outputted from the video/audio playback apparatus according to the embodiment of the present invention.
Figure 15:
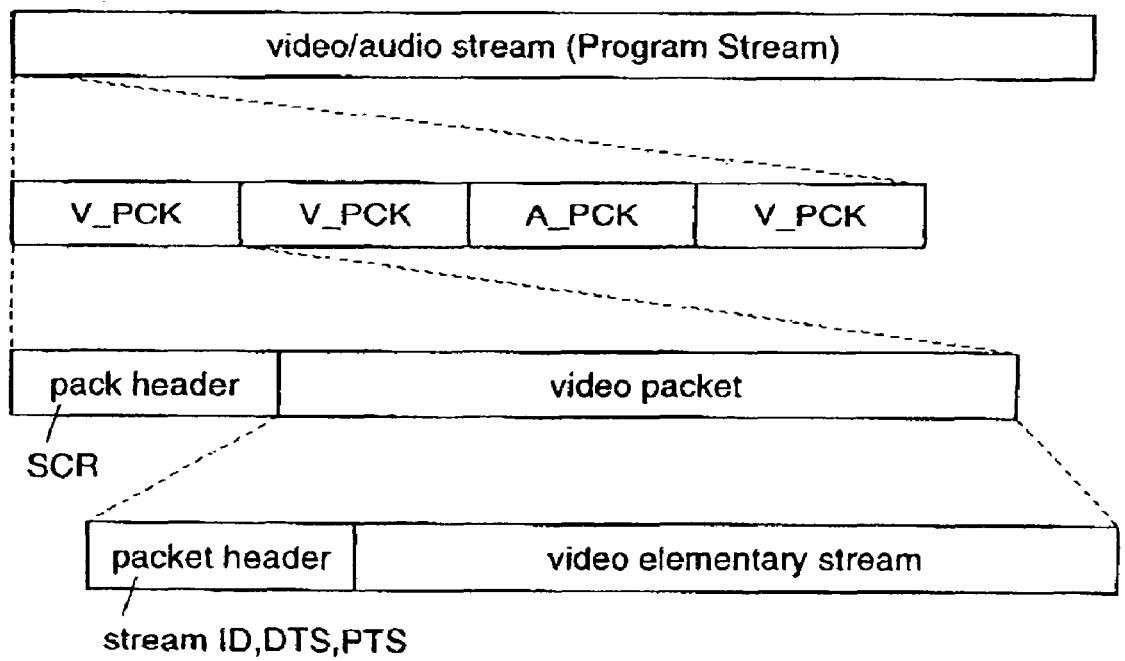
FIG. 15 is a schematic diagram for explaining a construction of a video/audio stream.
Figure 16:
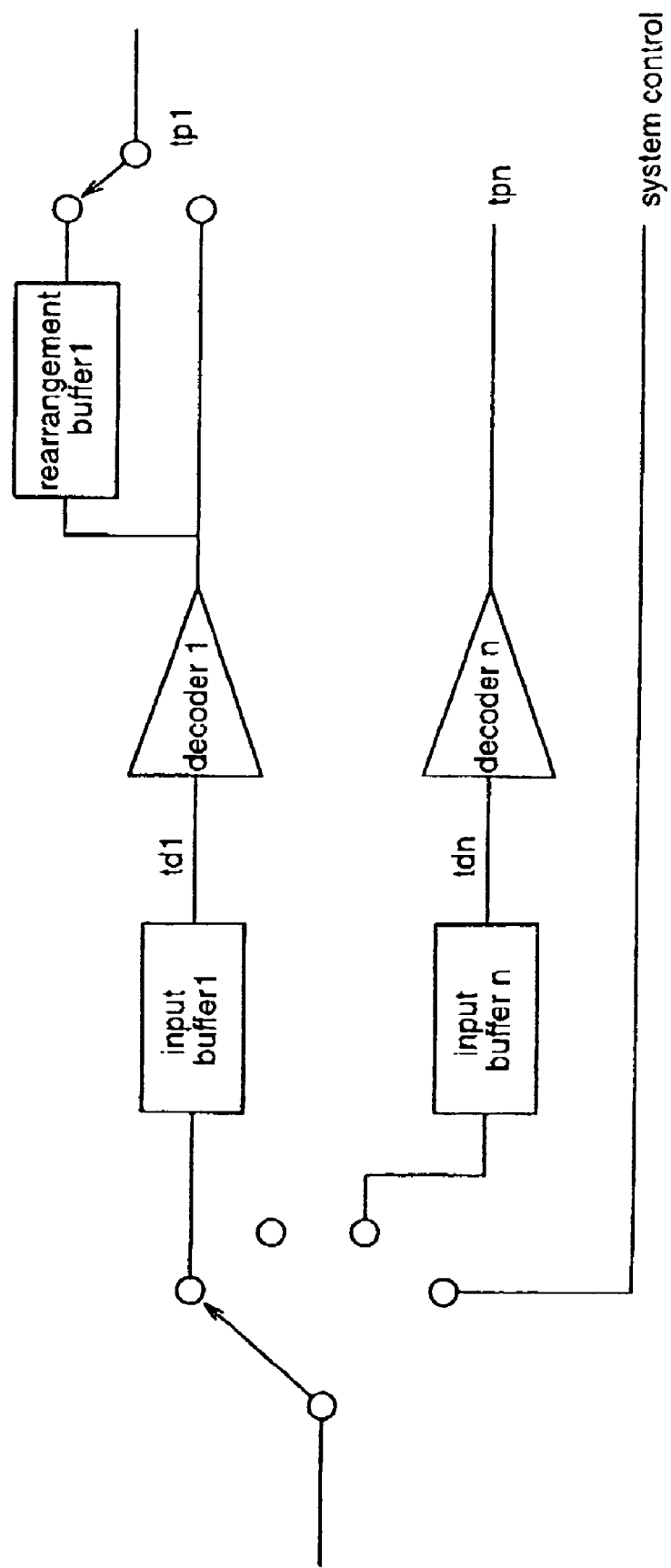
FIG. 16 is a block diagram illustrating a prior art MPEG2 program stream system target decoder.

Then, when the user sets the playback time as being displayed on the screen, the playback time of audio can be displayed on a screen such as a monitor as a current playback time by combining the playback time management information with the video signal outputted from the video decoder 112, for example, as shown in FIG. 12. Further, both video playback time and audio playback time may be displayed as shown in FIG. 13. Further, when the user sets a setting of "time to be displayed" to "video" in the setting menu shown in FIG. 11, only the video playback time can be displayed as shown in FIG. 14.

Further, while in this embodiment the description is given for the video and audio streams, the similar operation is possible for sub-video stream.

Moreover, while in this embodiment the playback of a recording medium such as a DVD or an HDD is taken as an example, the reproduction of the streaming contents through a digital broadcasting or a network can be performed in the similar operation by temporality storing the streaming contents in a recording medium such as a memory.

The video/audio playback apparatus according to the present invention is useful in that an operation of freely playing a video can be performed with an audio being normally played, and an apparatus for reproducing a coded video/audio stream from a random accessible recoding medium can be provided with a novel playback function.

What is claimed is:

1. A video/audio playback apparatus which reads a video/audio stream recorded in a random accessible recording medium, and reproduces the video/audio stream based on a reference time and based on time management information which is embedded in each of a video stream and an audio stream which constitute the video/audio stream, comprising:
 a video operation switching circuit for indicating that a playback operation of the video stream is to be switched;
 a data reading circuit for reading the video/audio stream from the recording medium as a for-audio-play video/audio stream and for reading the audio/video stream from the recording medium as a for-video-play audio/video stream when performing trick play of the video stream according to the video operation switching circuit;
 a first stream buffer for storing the for-audio-play video/audio stream which is read by the data reading circuit;
 a second stream buffer for storing the for-video-play video/audio stream which is read by the data reading circuit;
 a separation circuit for separating an audio stream from the for-audio-play video/audio stream which is stored in the first stream buffer, and for separating a video stream from the for-video-play video/audio stream which is stored in the second stream buffer;
 a counter for outputting a predetermined clock as a reference time based on time management information embedded in the for-audio-play video/audio stream;
 an audio playback circuit for reproducing the audio stream separated from the for-audio-play video/audio stream based on time management information embedded in the audio stream and the reference time, during trick play of the video stream; and
 a video playback circuit for reproducing the video stream separated from the for-video-play video/audio stream based on time management information embedded in the video stream, which is different from the time management information embedded in the audio stream used in the audio playback circuit, when performing trick play of the video stream.

2. The video/audio playback apparatus as defined in claim 1, wherein
the video/audio stream is a stream into which the digital-compressed video and audio are multiplexed according to the MPEG format.

3. The video/audio playback apparatus as defined in claim 1, wherein
the video operation switching circuit gives instructions for switching among normal playback for synchronously reproducing an audio stream and a video stream having the same time management information, video trick play for performing trick play of only a video stream, and video asynchronous playback for asynchronously reproducing an audio stream and a video stream each having time management information.

4. The video/audio playback apparatus as defined in claim 3, wherein
the video playback circuit performs trick play of the video stream by using the video stream separated from the for-video-play video/audio stream on receiving the instruction for the video trick play operation from the video operation switching circuit.

5. The video/audio playback apparatus as defined in claim 4, wherein
the data reading circuit reads the video/audio stream from the recording medium with higher priority when reading the video/audio stream as a for-audio-play video/audio stream than when reading the video/audio stream as a for-video-play video/audio stream, and continuously transmits the audio stream to the audio playback circuit so as not to interrupt audio which is to be played by the audio playback circuit when receiving the instruction for the video trick play operation from the video operation switching circuit.

6. The video/audio playback apparatus as defined in claim 5, wherein
the video playback circuit reproduces the video stream separated from the for-video-play video/audio stream using a value obtained by subtracting, from the reference time, a differential value between the time management information embedded in the video stream which was outputted most recently at the video trick play and the reference time as of the time at which the video trick play is stopped, as a reference time for reading the video stream, when receiving the instruction for performing the video asynchronous playback during the video trick play from the video operation switching circuit.

7. The video/audio playback apparatus as defined in claim 6, wherein
the video playback circuit is further operable to reproduce the video stream separated from the for-audio-play video/audio stream on the basis of the time management information embedded in the video stream and the reference time when receiving the instruction for performing the normal playback operation during the video asynchronous playback operation from the video operation switching circuit.

8. The video/audio playback apparatus as defined in claim 7, comprising
a playback time display circuit for visually displaying one of a playback time of the audio which is played by the audio playback circuit and a playback time of the video which is played by the video playback circuit, or both of them.

9. The video/audio playback apparatus as defined in claim 4, wherein
the video playback circuit reproduces the video stream of the for-audio-play video/audio stream on the basis of the time management information embedded in the video stream and the reference time when the time management information embedded in the video stream which is being subjected to video trick play coincides with the reference time.

10. The video/audio playback apparatus as defined in claim 9, comprising
a playback time display circuit for visually displaying one of a playback time of the audio which is played by the audio playback circuit and a playback time of the video which is played by the video playback circuit, or both of them.

11. The video/audio playback apparatus as defined in claim 1, comprising
a display video control circuit for displaying a display video which was outputted immediately before an instruction for switching a video operation, on a sub-screen which is other than a main screen onto which the video stream is reproduced, when receiving the instruction for switching the video operation from the video operation switching circuit.

12. The video/audio playback apparatus as defined in claim 11, wherein
the display video control circuit displays, when receiving an instruction for switching a video operation from the video operation switching circuit in a state where the videos are displayed on the main screen and the sub-screen, the display video which was outputted onto the main screen immediately before the instruction for switching the video operation is received, on a new sub-screen.

13. The video/audio playback apparatus as defined in claim 12, further comprising
a video operation selection circuit for selecting one of the sub-screens, wherein
the display video control circuit switches between a video display on the sub-screen selected by the video operation selection circuit and the video display on the main screen and displays the respective videos when receiving an instruction for switching a video operation from the video operation switching circuit, and
the video playback circuit reproduces a video stream so as to start playback from the switched display video on the main screen.

14. A video/audio playback method for reading a video/audio stream recorded in a random accessible recording medium, and reproducing the video/audio stream based on time management information embedded in each of a video stream and an audio stream which constitute the video/audio stream and based on a reference time, comprising:
reading the video/audio stream from the recording medium as a for-audio-play video/audio stream, and reading the video/audio stream from the recording medium as a for-video-play video/audio stream when performing trick play of the video stream;
storing the for-audio-play video/audio stream in a first buffer, and storing the for-video-play video/audio stream in a second buffer;

extracting a predetermined clock as a reference time based on predetermined time management information embedded in the for-audio-play video/audio stream;

reproducing an audio stream of the for-audio-play video/audio stream based on time management information embedded in the audio stream and the reference time; and reproducing the video stream separated from the for-video-play video/audio stream based on time management information embedded in the video stream, which is different from the time management information embedded in the audio stream used in reproducing the audio stream, when performing trick play of the video stream.

15. The video/audio playback method as defined in claim 14, comprising:

stopping trick play of the video stream;

obtaining a differential value between the time management information embedded in the video stream which was outputted most recently at the trick play of the video stream and the reference time as of the time at which the video trick play is stopped and subtracting the differential value from the reference time; and reproducing the video stream separated from the for-video-play video/audio stream using the subtraction value as the second reference time for reproducing video stream.

16. The video/audio playback method as defined in claim 14, comprising reproducing the video stream of the for-audio-play video/audio stream on the basis of the time management information embedded in the video stream and the reference time when the time management information embedded in the video stream which is being subjected to trick play coincides with the reference time.

17. The video/audio playback method as defined in claim 14, comprising performing the trick play of the video stream with the display video from which the trick play is started being displayed on another screen when performing the trick play of the video stream.

* * * * *